US 8,260,481 B2

(12) United States Patent
Naik et al.

(10) Patent No.: US 8,260,481 B2
(45) Date of Patent: Sep. 4, 2012

(54) METHOD OF MANAGING POWER FLOW IN A VEHICLE

(75) Inventors: Sanjeev M. Naik, Troy, MI (US); Ashish S. Krupadanam, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1057 days.

(21) Appl. No.: 12/190,659

(22) Filed: Aug. 13, 2008

(65) Prior Publication Data
US 2010/0042277 A1  Feb. 18, 2010

(51) Int. Cl.
*B60W 30/18* (2006.01)
*B60W 20/00* (2006.01)
*B60W 10/06* (2006.01)
*B60W 10/10* (2006.01)

(52) U.S. Cl. ........................................ 701/22

(58) Field of Classification Search ............. 701/22, 701/1, 99, 105, 200
See application file for complete search history.

(56) References Cited

U.S. PATENT DOCUMENTS

| | | | | |
|---|---|---|---|---|
| 7,360,615 B2 * | 4/2008 | Salman et al. | ........... | 180/65.265 |
| 7,539,562 B2 * | 5/2009 | Maguire et al. | ................. | 701/22 |
| 7,865,298 B2 * | 1/2011 | Macneille et al. | ............. | 701/201 |
| 8,024,112 B2 * | 9/2011 | Krumm et al. | ................ | 701/209 |
| 2002/0188387 A1 * | 12/2002 | Woestman et al. | ............. | 701/22 |
| 2005/0228553 A1 | 10/2005 | Tryon | | |
| 2007/0112475 A1 * | 5/2007 | Koebler et al. | .................... | 701/1 |
| 2007/0208467 A1 * | 9/2007 | Maguire et al. | ................. | 701/22 |

* cited by examiner

Primary Examiner — John Nguyen
Assistant Examiner — Rodney P King

(57) ABSTRACT

A vehicle includes a powertrain system and a traffic sensing system. Power flow in the vehicle is managed by determining a present location and a trajectory of the vehicle, and determining traffic level information based on the present location and trajectory. A speed profile for the vehicle is predicted based upon the traffic level information of the vehicle and the powertrain is operated to manage power flow in the vehicle based upon on the predicted speed profile.

20 Claims, 5 Drawing Sheets

METHOD OF MANAGING POWER FLOW IN A VEHICLE

TECHNICAL FIELD

This disclosure is related to managing power flow within vehicles.

BACKGROUND

The statements in this section merely provide background information related to the present disclosure and may not constitute prior art.

Vehicle manufacturers are currently developing vehicles that use non-combustion power sources to generate tractive torque. Exemplary vehicles utilizing non-combustion power sources to generate tractive torque include electric vehicles, hybrid electric vehicles and hydraulic hybrid vehicles.

Hybrid vehicles can utilize a non-combustion power source to achieve improved fuel economy and reduced emission levels over vehicles that utilize only internal combustion engines to provide vehicle propulsion. Hybrid vehicles achieve improved fuel economy and reduced emission by selectively utilizing an internal combustion engine or the non-combustion power source. Exemplary vehicles having non-combustion power sources can convert electrical power through motor/generator units. Motor/generator units can function as a motor to convert electrical power from batteries to provide torque to the transmission, independent from torque input from the internal combustion engine. Motor/generator units can function as a generator to convert kinetic energy from the vehicle transmission to electrical power stored by the batteries. In particular, hybrid electric vehicles can utilize regenerative braking in which the hybrid electric vehicle's speed is reduced by converting kinetic energy from the moving vehicle to electrical power stored in the batteries.

By controlling motor and generator functionality of the motor/generator units, control systems can control the balance between electrical power and internal combustion power utilized by the powertrain. The control systems can maintain batteries at a state of charge that is within calibrated upper and lower charging limits. The state of charge is a ratio of the amount of electrical charge of a battery to the charge capacity of the battery. The lower charging limit is calibrated such that the battery state of charge is sufficiently high such that the battery can provide a selected amount of torque to the transmission. The upper charging limit is calibrated such that the battery state of charge is sufficiently low to accept charge from regenerative braking.

Global positioning systems hereafter ('GPS') utilize satellites to transmit signals to provide positioning information to GPS devices. Vehicles can utilize the GPS devices to determine a current position on the earth along with related information such as a current speed and a current direction at which the GPS device is travelling.

Map databases include information relating to a geographic region and can perform navigation functions such as determining travel routes to guide a driver within the geographic region. The travel route can include roads, streets or any other type of thoroughfare.

SUMMARY

A vehicle includes a powertrain system and a traffic sensing system. Power flow in the vehicle is managed by determining a present location and a trajectory of the vehicle, and determining traffic level information based on the present location and trajectory. A speed profile for the vehicle is predicted based upon the traffic level information of the vehicle and the powertrain is operated to manage power flow in the vehicle based upon on the predicted speed profile.

BRIEF DESCRIPTION OF THE DRAWINGS

One or more embodiments will now be described, by way of example, with reference to the accompanying drawings, in which.

DETAILED DESCRIPTION

Figure 1:
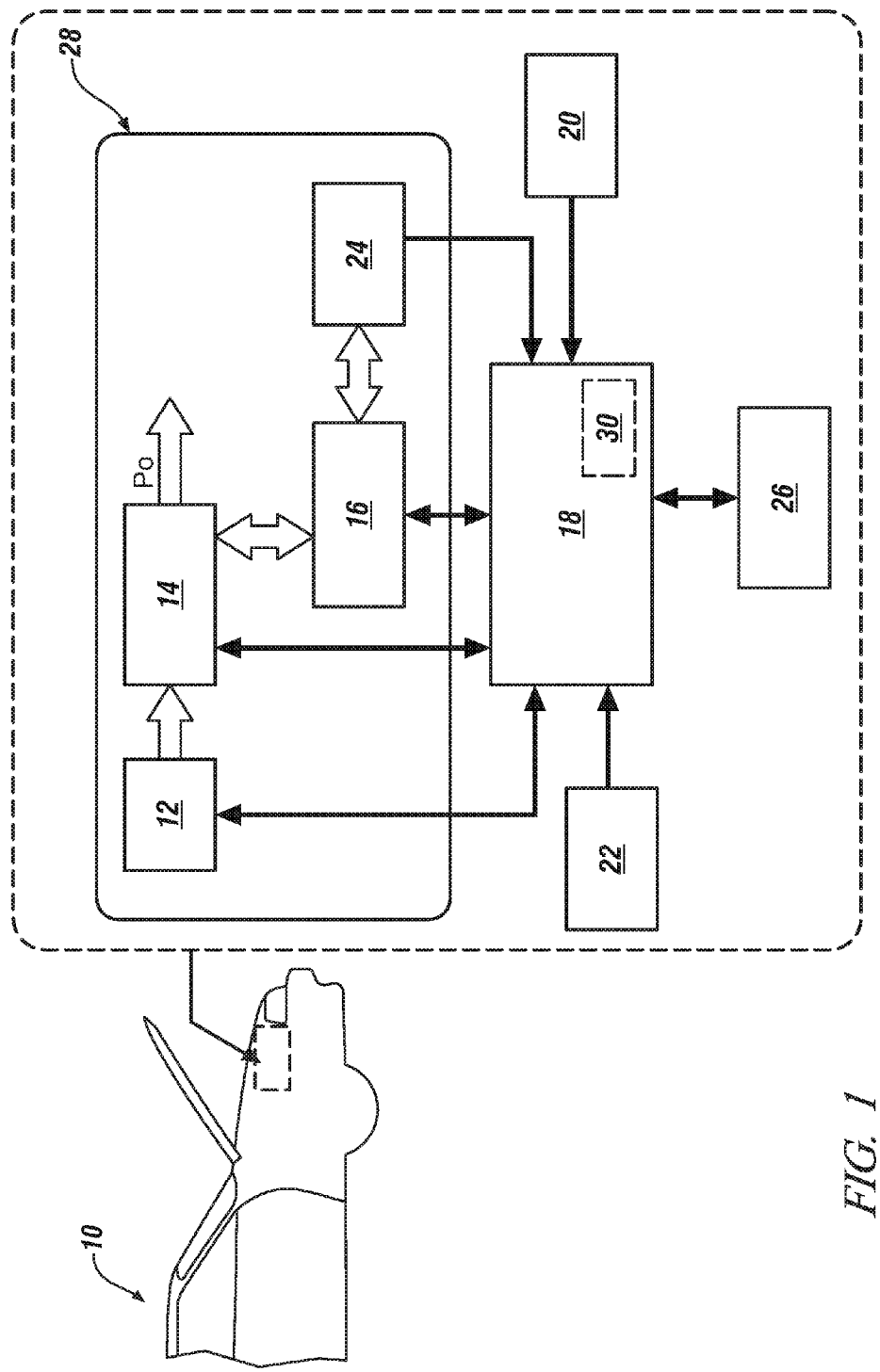
FIG. 1 depicts a block diagram of an exemplary vehicle in accordance with an exemplary embodiment of the present disclosure.

Referring now to the drawings, wherein the showings are for the purpose of illustrating certain exemplary embodiments only and not for the purpose of limiting the same, FIG. 1 depicts a vehicle 10 comprising a powertrain 28 including an engine 12 and a battery 24. Battery as used herein is understood to include one or more batteries. Although an exemplary embodiment is described herein with reference to the vehicle 10 including a combustion power source, that is, the engine 12, and an electric power source, that is a battery 24, the present disclosure relates to managing power flow in other types of power sources providing non-combustion, tractive power within a powertrain of a vehicle.

As used herein, non-combustion power sources refer to any type of power source in which power is not primarily directly provided utilizing a combustion reaction. However, the non-combustion power sources can provide power that was previously converted utilizing a combustion reaction. Exemplary non-combustion power sources include electrical power storage devices and hydraulic power storage devices.

Although specific embodiments of the disclosure are described in relationship to the vehicle 10, alternate embodiments include other vehicles including vehicles utilizing other non-combustion power sources. For example, alternate embodiments include electric vehicles without a second power source. Further, alternate embodiments include hybrid vehicles comprising other types of power sources, in addition to, or instead of, the electric power sources.

FIG. 1 illustrates the vehicle 10 comprising the powertrain 28 comprising the engine 12, a transmission 14, an electric machine operative as a motor and generator (hereafter motor/generator unit or 'MGU') 16, and the battery 24. The vehicle 10 further includes a control system 18, a global positioning system (hereafter 'GPS') device 20, a wireless communications system 22, and a traffic sensing system 26.

The exemplary engine 12 comprises a multi-cylinder internal combustion engine selectively operative in several states to transmit power to the transmission 14, and can be either a spark-ignition or a compression-ignition engine. The engine 12 includes a crankshaft (not shown) operatively coupled to the transmission 14. The engine 12 further comprises multiple sensors (not shown) that monitor operating conditions of the engine 12 and communicate with the control system 18.

The exemplary transmission 14 transfers mechanical power between the engine 12, the MGU 16, and the driveline (not shown) to provide an output power ($P_O$) to propel the vehicle 10. The exemplary transmission 14 comprises planetary-gear sets (not shown) and selectively engageable torque-transmitting devices, i.e., clutches (not shown). As used herein, clutches refer to any type of friction torque transfer device including, for example, single or compound plate clutches or packs, band clutches, and brakes. A hydraulic control circuit (not shown) is utilized by the control system 18 to control clutch states such that the transmission 14 can operate in different gear states. Each different gear state provides a preset ratio or a continuously variable ratio of input and output speeds of the transmission 14.

The MGU 16 is configured to receive torque commands from the control system 18 and meet commanded torque levels in motor drive mode or regeneration mode (for example, during regenerative braking). The MGU 16 operates in the motor drive mode to transfer torque to the transmission 14. The MGU 16 operates in regeneration mode to accept torque through the transmission 14 and to convert kinetic energy to electrical power for storage within the battery 24.

The battery 24 is electrically connected to the MGU 16 to transfer electrical power to and from the MGU 16. The battery 24 stores electrical power generated by the MGU 16 when the MGU 16 operates in the regenerative braking mode and supplies electrical power to the MGU 16 when the MGU 16 operates in motor drive mode. Multiple sensors (not shown) monitor and determine parameters of the battery 24 including battery voltage, battery temperature, and available battery power, and the sensors send signals indicative of the parameters of the battery 24 to the control system 18 to determine parameters such as battery state-of-charge.

Although exemplary vehicle 10 utilizes the battery 24 as a non-combustion, tractive power source, other exemplary vehicles can utilize other non-combustion, tractive power sources. In one embodiment, a vehicle utilizes a capacitor or an ultracapacitor as the non-combustion, tractive power source. In one embodiment, a vehicle utilizes a hydraulic accumulator as the non-combustion, tractive power source.

The exemplary control system 18 provides coordinated system control of the components of the vehicle 10 including the engine 12, the transmission 14, the MGU 16, the battery 24, the GPS device 20, the wireless communications system 22, the traffic sensing system 26 and other components of the vehicle 10. The control system 18 comprises a distributed control module system (not shown) configured to synthesize pertinent information and inputs including a speed sensor detecting a current vehicle speed, and execute algorithms to control various actuators to achieve control objectives, including objectives related to fuel economy, emissions, performance, drivability, and protection of hardware. Control modules (not shown) of the control system 18 can include general-purpose digital computers comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry.

The control system 18 preferably includes a map database 30 located in one of the storage mediums (not shown). The map database 30 includes map database information, that is, information relating to a geographic region and information relating to potential travel routes. The potential travel routes can include roads, streets or any other type of thoroughfare on which the vehicle 10 can travel. In one embodiment, the map database 30 includes information associated with potential travel routes including the location of the potential travel routes relative to GPS coordinates, grade and surface feature information, an average speed of a vehicles traveling on the potential travel routes, intersections, that is, intersections with other roads, intersections with pedestrian walkways, and intersections with railroad tracks, traffic signal information associated with the intersection, and like information. The stored information can be updated periodically by, for example, downloading information via the wireless communications system 22. In alternate embodiments, the control system 18 can access the map database 30 through wireless communications with an external computer network without storing the map database 30 within the control system 18.

The GPS device 20 is configured to receive GPS information, that is, a location or global position, a trajectory, and a speed of the vehicle 10. The GPS device 20 sends GPS information to the control system 18.

The wireless communications system 22 receives wireless broadcasts from an external data system. In one embodiment, the wireless communications system 22 can receive broadcasts via a satellite receiver (not shown). In other exemplary embodiments, the wireless communications system 22 can receive wireless communications from other sources (such as, cellular communications transmission, terrestrial radio transmissions, or other wireless transmission sources.) The wireless communications can include encoded data from a computer data network such as, for example, the Internet.

The traffic sensing system 26 is configured to provide traffic sensing system information, including location of vehicles 50 proximate the vehicle 10. In one embodiment, the traffic sensing system 26 comprises a radar device (not shown) configured to detect vehicles 50 proximate the vehicle 10. An exemplary radar device can detect vehicles 50 by transmitting electromagnetic radiation to the vehicles 50 and measuring properties of the electromagnetic radiation reflected from the vehicles 50. The electromagnetic radiation property measurements are utilized by the control system 18 to detect the speed and location of the vehicles 50. In one embodiment, the traffic sensing system 26 detects whether vehicle 50 is in front of the vehicle 10 and whether vehicles 50 are in either lane adjacent to the vehicle 10. In one embodiment, the traffic sensing system 26 determines a speed and a trajectory of the vehicles 50 in front the vehicle 10 and vehicles 50 adjacent to the vehicle 10.

In alternate embodiments, the traffic sensing system 26 can comprise devices utilizing other detection technologies instead of, or in addition to radar, such as lidar devices and camera-based devices to detect the location and the speed of the vehicles 50. In one embodiment, the traffic sensing system 26 comprises a lidar device configured to detect the location and the speed of the vehicles 50. The exemplary lidar device detects a distance and a speed of the vehicle 50 using laser pulses. The lidar device transmits the laser pulses and photodiodes of the lidar device receive reflected light from the laser pulses and converts the reflected light to electrical signals. The control system 18 utilizes the electrical signals from the lidar device to detect the speed and location of the vehicles 50. In one embodiment, the traffic sensing system 26 includes a plurality of sensors such as a plurality of radar devices, a plurality of lidar devices, or a plurality of sensors including both radar devices and lidar devices.

Figure 2:
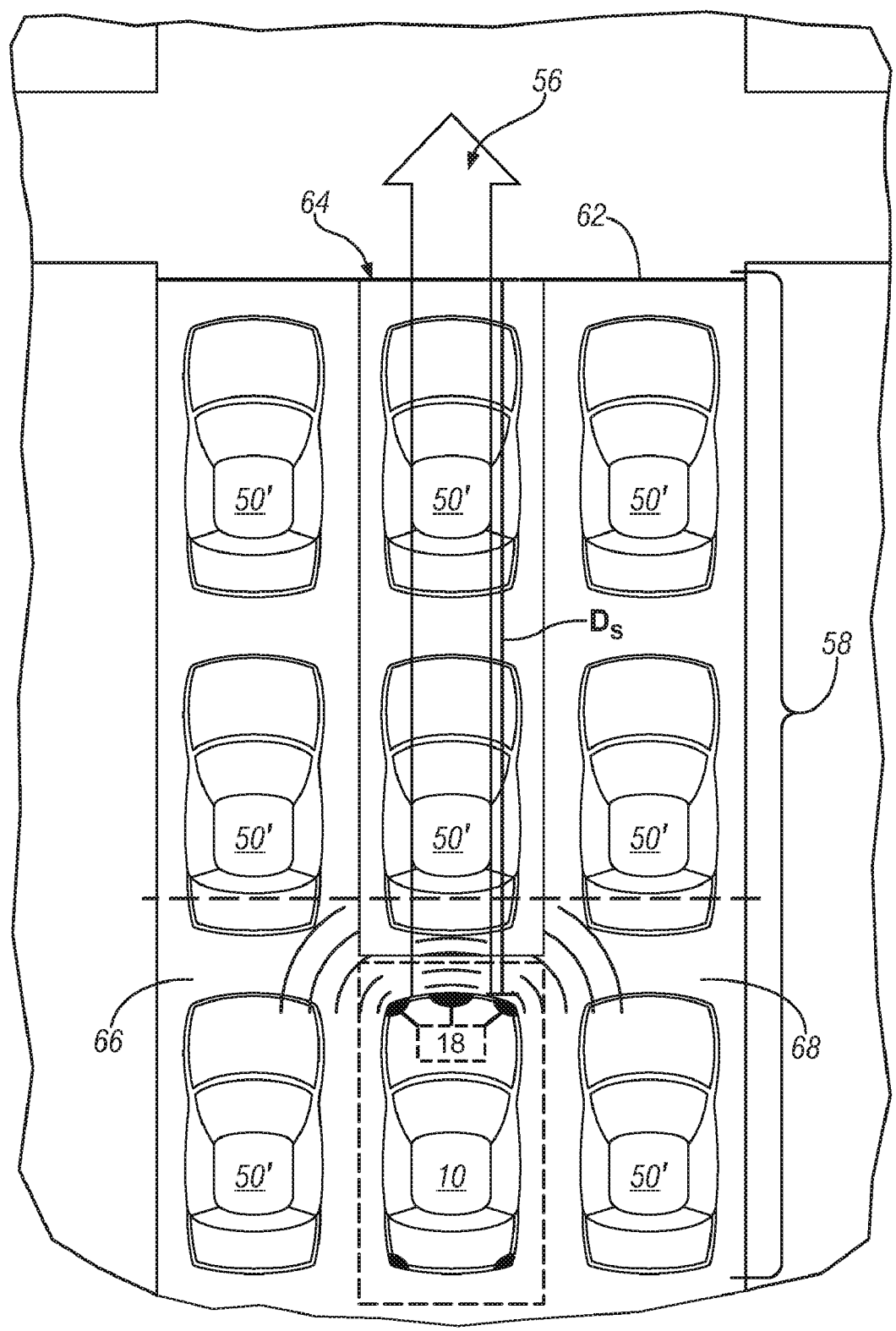
FIG. 2 depicts the vehicle of FIG. 1, and a travel route in accordance with an exemplary embodiment of the present disclosure.
Figure 3:
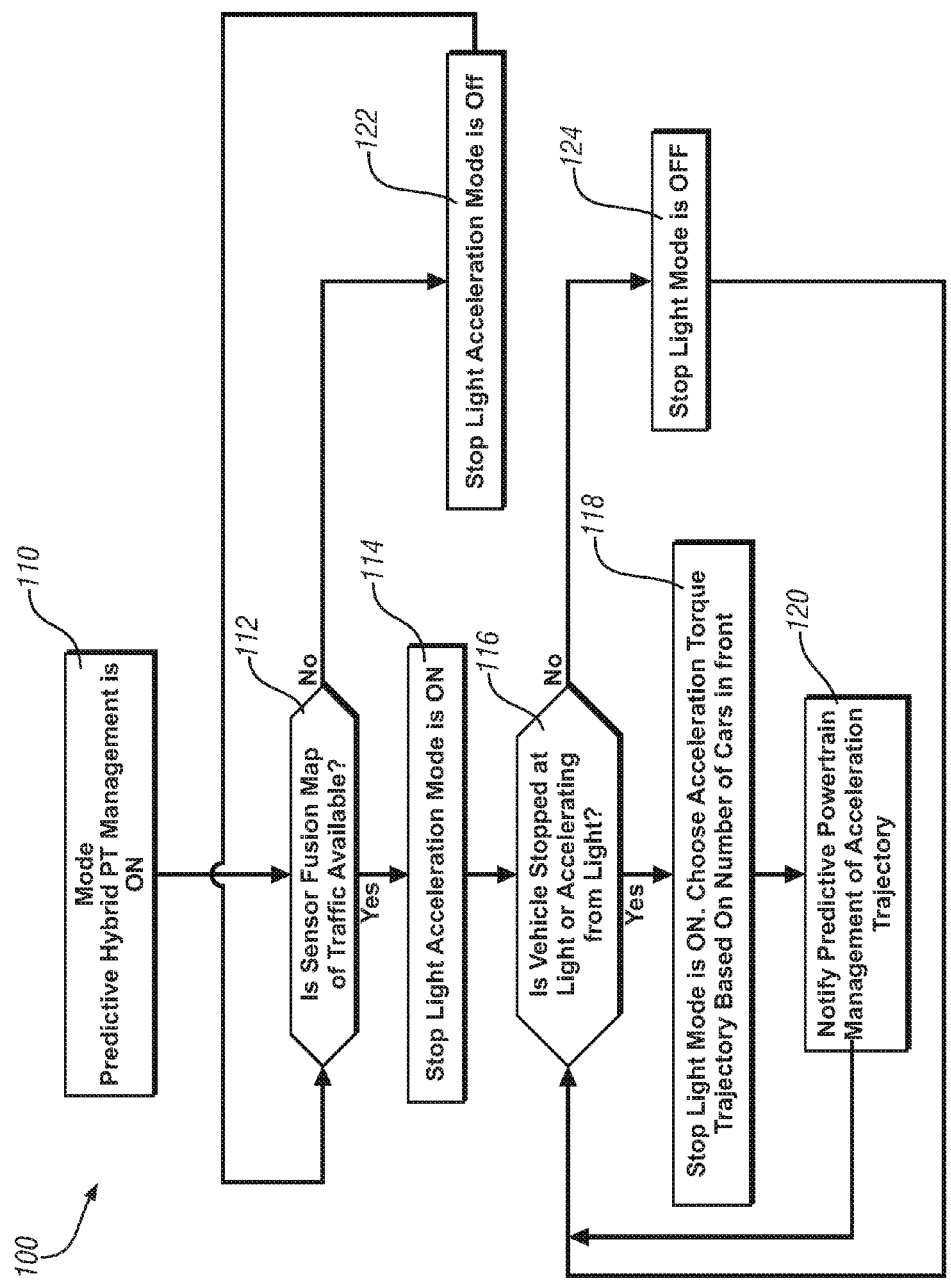
FIGS. 3 and 4 depict a process flow diagram of a method of managing a power source within a powertrain in accordance with an exemplary embodiment of the present disclosure.
Figure 4:
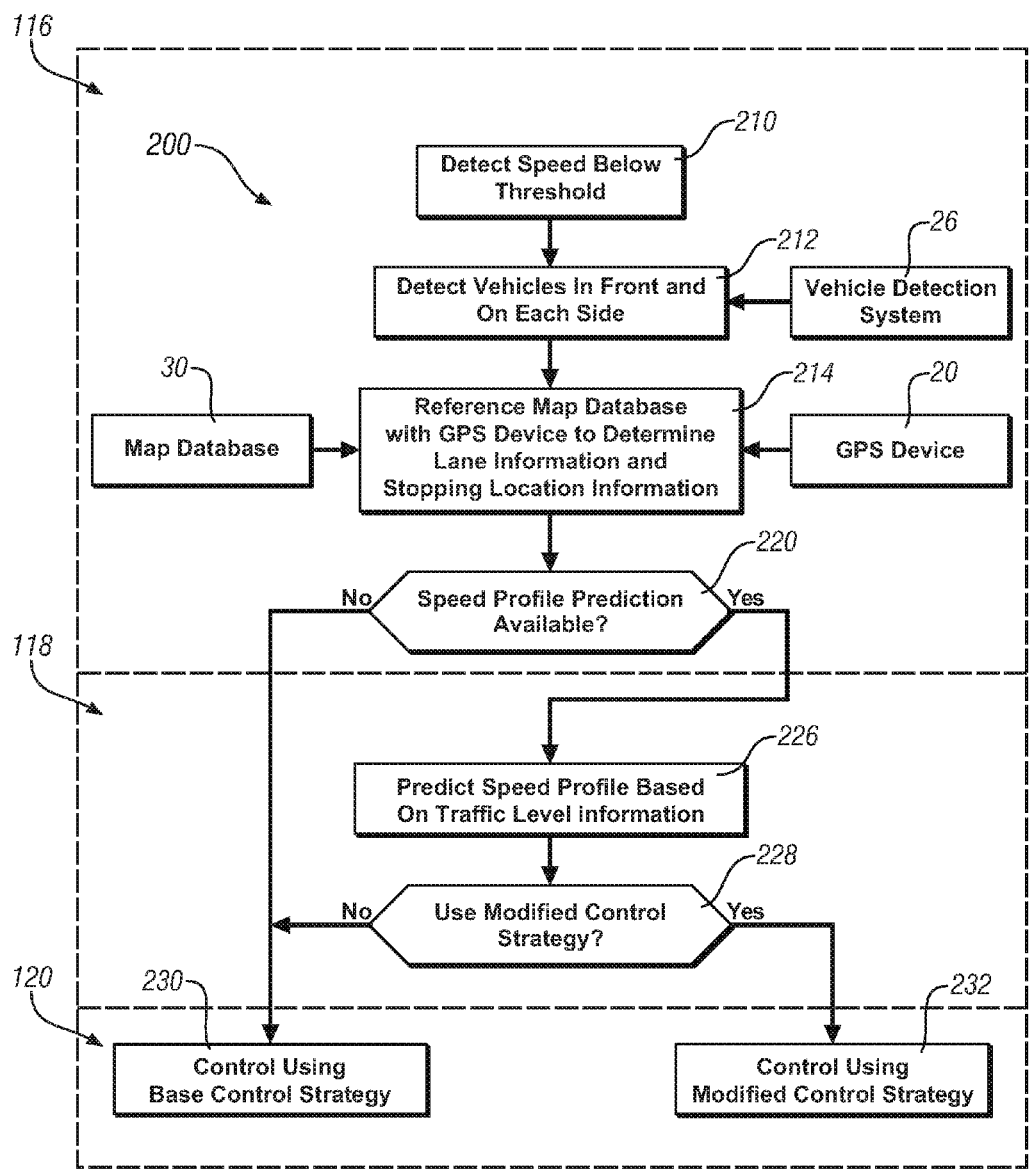
Figure 5:
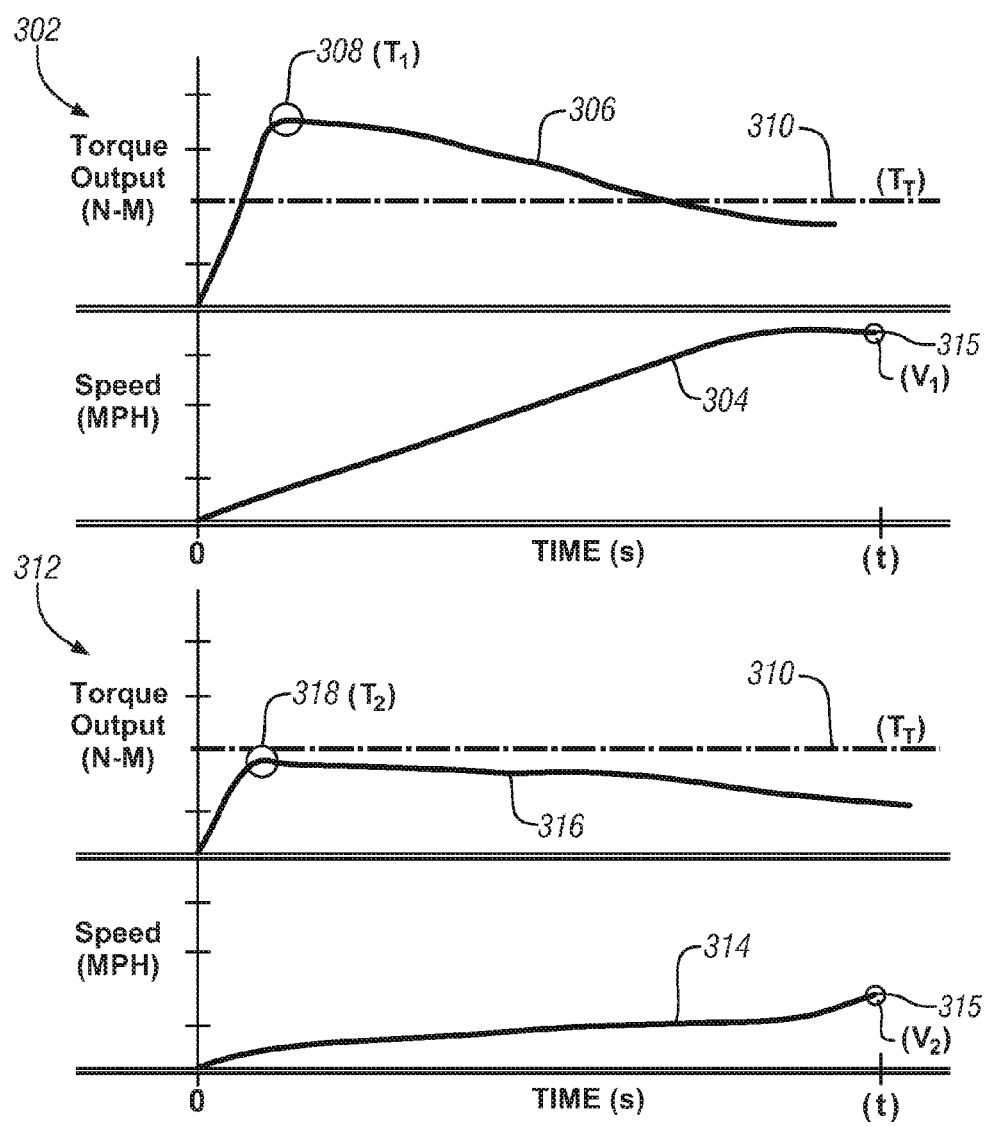
FIG. 5 depicts graphical representations of torque profiles and speed profiles utilized by the method of FIGS. 3 and 4 in accordance with an exemplary embodiment of the present disclosure.

A method 100 for managing a power flow in the vehicle 10 including a powertrain 26 as depicted in FIGS. 3, 4, and 5 will now be described with reference to exemplary vehicle 10 on an exemplary travel route 56 as depicted in FIG. 2.

The control system 18 initiates the method 100 for managing power within the powertrain 28 (110). In one embodiment, the control system 18 initiates the method in response to an operator command, for example, an operator operating an "on" switch. In one embodiment, the control system 18 initiates the method 100 when a wireless signal is received via the wireless communications system 22.

The control system 18 determines the travel route 56 and determines whether traffic information is available (112). The travel route 56 can be determined from potential travel routes from the map database 30. The travel route 56 comprises travel distances and trajectories which the vehicle must travel to arrive at a selected destination. The traffic information includes GPS location information from the GPS device 20, map database information from the map database 30 associated with the GPS location information, and traffic sensing system information from the traffic sensing system 26. In one embodiment, the control system 18 determines the travel route based on an input trip destination and provides directions to the trip destination to a vehicle operator such that the vehicle operator can follow the directions (that is, trajectories and distances of the travel route 56) when operating the vehicle. In one embodiment, the control system 18 determines the travel route 56 by determining the current travel trajectory of the vehicle 10. Different travel routes can be associated with different distances.

In one embodiment, when determining whether the traffic information is available, the control system 18 determines whether the GPS location information from the GPS device 20 is available. The control system 18 references the GPS location information from the GPS device 20 with the map information from the map database 30 to determine whether map database information is available for a region (not shown) associated with the GPS information. The control system 18 further determines whether traffic sensing system information is available from the traffic sensing system 26. If the control system 18, determines that the traffic information is available, the control system 18 proceeds to step 114. If the control system 18 determines that the traffic information is not available, the control system 18 proceeds to step 122.

The control system 18 sets a traffic information availability variable to indicate traffic information is not available (122) and then continually loops back to step 112 to continually check whether the traffic information is available.

The control system 18 sets a traffic information availability variable to indicate that traffic information is available (114). The control system 18 determines whether the hybrid vehicle 10 can project a speed profile (116) utilizing current vehicle speed, the map database information, and the GPS location information.

FIG. 4 depicts steps 210, 212, 214, 220 of step 116, steps 226, and 228 of step 118, and steps 230 and 232 of step 120. The control system 18 detects whether the current vehicle speed is below a threshold speed (210). When the control system 18 detects the current vehicle speed level below the threshold speed level, the control system 18 proceeds to step 212.

In other embodiments, the control system 18 can utilize other information to determine whether to proceed to step 212, for example, the control system can utilize information indicative of whether the vehicle 10 is accelerating or decelerating.

The control system 18 utilizes the traffic sensing system information from the traffic sensing system 26 to determine traffic information in a region 58 depicted in FIG. 2 of the travel route 56 (212). The traffic information includes whether vehicles are located in subregion 64 of region 58. The subregion 64 comprises vehicles 50 between the vehicle 10 and a stopping location 62, for example, vehicles 50 in a common travel lane (for example, a common lane on a road). The stopping location 62 can include any predetermined location relative to the vehicle 10 and can be correlated with locations within the map database 30. In exemplary embodiments, the stopping location 62 can be associated with an intersection or a traffic signal.

The exemplary traffic sensing system information further includes distance information between the vehicle 10 and the vehicle 50 within the subregion 64. The exemplary traffic sensing system information further includes whether vehicles 50 are located in a subregion 66 of the region 58 or a subregion 68 of the region 58 adjacent to the vehicle 10.

The control system 18 accesses lane information of the map database information associated with the GPS location information (214). The lane information includes lane information of the travel route 56 of the vehicle 10 including a number of lanes of a road of the travel route 56, the direction or type of travel designated for each lane of the road, and the current lane that the vehicle 10 is located in. The control system 18 references the lane information from the map database with the vehicle detection system information to determine whether vehicles 50 moving below a threshold speed (for example, stopped vehicles 50) and moving in the same direction as vehicle 10 are present in lanes adjacent to the vehicle 10.

If the control system 18 determines that lanes adjacent to the vehicle 10 include vehicles 50, the control system 18 determines that the lane information is indicative of an available speed profile prediction.

The control system 18 references stopping location information with the GPS information to determine whether stopping locations, such as stopping location 62, are present on the travel route 56 proximate to the vehicle 10. The control system 18 references stopping location information with the GPS information to determine whether a distance $D_S$ between the vehicle 10 and the stopping location 62 is less than a threshold distance $D_T$. If the control system 18, determines that the distance $D_S$ between the vehicle 10 and the stopping location 62 is less than a threshold distance $D_T$, the control system 18 determines that the stopping location is indicative of an available speed profile prediction.

The control system 18 determines whether a speed profile prediction is available (220). If the control system 18 determines that the stopping location information and the lane information are indicative of an available speed profile prediction, the control system 18 proceeds to steps 118, 226. If the control system 18 determines that the stopping location information and the lane information are not indicative of the available speed profile prediction, the control system 18 proceeds to steps 230. The control system 18 sets a speed profile variable to ('off') and continually loops to determine whether the speed profile is available 230.

The control system 18 predicts a speed profile based on traffic level information (226). In one embodiment, the control system 18 determines traffic level information based on the distance $D_S$, by estimating a number of cars that is represented by the distance $D_S$ by dividing the distance $D_S$ by an average car length value. In one embodiment, the control system 18 utilizes auxiliary traffic information received through the wireless communications system 20 or maintained in the map database 30 along with traffic sensing system information detected by the traffic sensing system 26 of the vehicle 10 to determine the traffic level information.

FIG. 5 depicts a graph of a first speed profile 304 associated with a first traffic level 302 and a graph of a second speed profile 314 associated with a second traffic level 312. The first speed profile 304 includes estimated speed levels of the vehicle 10 as the vehicle 10 accelerates from a stop to a first speed ($V_1$) over a time duration (t). The first speed profile 304 is associated with a powertrain output torque profile 306 over the time duration (t) having a first maximum powertrain output torque ($T_1$) 308. The second speed profile 314 includes estimated speed levels of the vehicle 10 as the vehicle accelerates from a stop to a second speed ($V_2$) over the time duration (t). The second speed profile 314 is further associated with an output torque profile 316 over the time duration (t) having a second maximum output torque ($T_2$) 318.

The control system controls the powertrain 28 utilizing either the base control strategy 230 or the modified control strategy 232 (228). The control system 18 selects a battery management strategy utilizing the predicted speed profile. In one embodiment, the control system 18 selects the battery management strategy based on whether a maximum powertrain output torque of a predicted powertrain output torque profile associated with the predicted speed profile is greater than a threshold torque level. For example, when the control system 18 determines the first traffic level 302, the control system 18 determines that the maximum powertrain output torque ($T_1$) 308 associated with the torque profile 306 is greater than a threshold torque level ($T_T$) 310, and therefore controls the powertrain 28 using a base control strategy (230). When the control system 18 determines the second traffic level 304, the control system 18 determines that the maximum output torque ($T_2$) 318 associated with the predicted powertrain output torque profile 316 is less than the threshold torque ($T_T$) 310, and therefore controls the powertrain 28 using a modified control strategy (232).

In one embodiment, the control system 18 utilizes both speed profile and map information to determine a charging strategy. For example, speed profiles or threshold power levels can be modified utilizing map database information such as road grade and surface feature information of the travel route 56.

The base control strategy 230 controls the powertrain based on a calculated operating cost associated with current and predicted powertrain operating states. The predicted base operating costs include average costs associated with operating the powertrain 28 over a range of permissible torque output levels.

Therefore, when operating utilizing the base control strategy, the control system 18 can select various powertrain operating states including a desired engine operating state, a desired gear-ratio of the transmission 14, a desired engine torque of the engine 12, and a desired motor torque of the MGU 16 in response to an operator torque request based on a base cost calculation. The control system 18 controls the powertrain operating states based on an operating state associated with a lowest base cost.

The control system 18 controls the powertrain utilizing the modified control strategy 232. The modified control strategy 232 controls the powertrain based on a calculated operating cost associated with current and predicted powertrain operating states including a predicted powertrain output torque request less than the threshold torque level.

Therefore, the modified control strategy can increase operating efficiency of the powertrain over the base control strategy when the predicted powertrain torque level is less than the threshold torque level. The control strategy can operate the powertrain 28 at a higher efficiency than the base control strategy by controlling a powertrain operating state in a high efficiency mode based on the powertrain torque requirements. In one embodiment, the control system 18 can operate the powertrain 28 in a high efficiency mode by adjusting injection timing and ignition timing to optimize fuel efficiency when a powertrain output torque less than the threshold torque level is determined. In one embodiment, the control system 18 can operate the powertrain 28 in a high efficiency mode by utilizing less torque in a stratified charge operating mode when a powertrain output torque less than the threshold torque level is determined. In one embodiment, control system 18 can operate the powertrain 28 by increasing the MGU motor torque relative to engine torque utilized by the powertrain and consequently operating the batteries at a lower state of charge when a powertrain output torque less than the threshold torque level is determined. By operating the battery 24 at a lower state of charge, the battery 24 has a greater storage capacity for conversion of kinetic energy to electrical power during regenerative braking thereby lowering the level of energy loss through heat loss during braking and thereby increasing fuel efficiency.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for managing a power flow in a vehicle including a powertrain system and a traffic sensing system, comprising:
    determining a present location and a trajectory of the vehicle;
    determining traffic level information based on the present location and trajectory;
    predicting a speed profile for the vehicle based upon the traffic level information of the vehicle only when a current vehicle speed is less than a threshold speed, a distance between the present location of the vehicle and a stopping location is less than a threshold distance, and at least one lane adjacent to the vehicle includes traffic; and
    operating the powertrain to manage power flow in the vehicle based upon on the predicted speed profile.

2. The method of claim 1, further comprising:
    controlling one of ignition timing and injection timing of an engine of the powertrain system based upon the predicted speed profile.

3. The method of claim 1, further comprising:
    controlling a gear ratio of a transmission of the powertrain system based upon the predicted speed profile.

4. The method of claim 1, further comprising:
    controlling torque of an electric machine of the powertrain system and torque of an engine of the powertrain system based upon the predicted speed profile.

5. The method of claim 1, comprising determining the current trajectory of the vehicle and the current location of the vehicle utilizing geographic coordinates measured by a global positioning system.

6. The method of claim 1, wherein determining traffic level information comprises detecting vehicles utilizing a radar device of the traffic sensing system.

7. The method of claim 1, wherein determining traffic level information comprises detecting vehicles utilizing a lidar device of the traffic sensing system.

8. The method of claim 1, wherein determining traffic level information comprises determining a distance between the present location and a predetermined location on a travel route.

9. The method of claim 1, wherein determining traffic level information comprises detecting traffic in a lane adjacent to the vehicle.

10. The method of claim 1, wherein predicting a speed profile for the vehicle based upon the traffic level information comprises predicting a speed profile over a predetermined time based on the traffic level information.

11. The method of claim 1, further comprising predicting a powertrain output torque profile associated with the predicted speed profile.

12. The method of claim 1, wherein operating the powertrain to manage the power flow comprises managing the power flow of a hybrid electric powertrain.

13. A method for managing a power flow in a vehicle including a powertrain system and a traffic sensing system, comprising:
   determining a present location and a trajectory of the vehicle;
   determining traffic level information of the vehicle for the present location and trajectory utilizing the traffic sensing system;
   predicting a powertrain output torque profile for the vehicle based upon the traffic level information of the vehicle only when a current vehicle speed is less than a threshold speed, a distance between the present location of the vehicle and a stopping location is less than a threshold distance, and at least one lane adjacent to the vehicle includes traffic;
   operating a non-combustion, tractive power generating device to manage power flow in the vehicle based upon on the predicted powertrain output torque profile; and
   operating the powertrain to manage power flow in the vehicle based upon the predicted powertrain output torque profile.

14. The method of claim 13, wherein operating the powertrain to manage power flow in the vehicle based upon the predicted powertrain output torque profile comprises operating the powertrain to manage power flow based on a maximum torque level of the predicted powertrain output torque profile.

15. The method of claim 13, wherein determining traffic level information comprises utilizing one of a radar device, a lidar device, and a camera-based device.

16. The method of claim 13, further comprising:
   controlling one of injection timing and ignition timing of an engine of the powertrain system based upon the predicted powertrain output torque profile.

17. The method of claim 13, further comprising:
   controlling a gear ratio of a transmission of the powertrain system upon the predicted powertrain output torque profile.

18. The method of claim 1, further comprising:
   controlling torque of an electric machine of the powertrain system and torque of an engine of the powertrain system based upon the predicted powertrain output torque profile.

19. A method for managing a power flow in a vehicle including a powertrain system including a non-combustion tractive power generating device and a traffic sensing system, comprising:
   determining a present location and a trajectory of the vehicle;
   determining traffic level information of the vehicle for the present location and trajectory;
   predicting a speed profile for the vehicle based upon the traffic level information of the vehicle only when a current vehicle speed is less than a threshold speed, a distance between the present location of the vehicle and a stopping location is less than a threshold distance, and at least one lane adjacent to the vehicle includes traffic; and
   operating the non-combustion, tractive power generating device to manage power flow in the vehicle based upon the predicted speed profile.

20. The method of claim 19, further comprising:
   controlling torque of the non-combustion tractive power generating device of the powertrain system and torque of an engine of the powertrain system based on the predicted speed profile.

* * * * *